US006672597B1

(12) United States Patent
Irrgeher et al.

(10) Patent No.: US 6,672,597 B1
(45) Date of Patent: Jan. 6, 2004

(54) SEALING STRIP FOR SEALING A JOINT

(75) Inventors: Fritz Irrgeher, Leverkusen (DE); Rüdiger Daniel, Wermelskirchen (DE); Hubert Hilger, Zülpich (DE)

(73) Assignee: Illbruck GmbH, Leverkusen (DE)

( * ) Notice: Subject to any disclaimer, the term of this patent is extended or adjusted under 35 U.S.C. 154(b) by 169 days.

(21) Appl. No.: 09/936,082

(22) PCT Filed: Sep. 15, 2000

(86) PCT No.: PCT/EP00/09040

§ 371 (c)(1),
(2), (4) Date: Jan. 31, 2002

(87) PCT Pub. No.: WO01/21921

PCT Pub. Date: Mar. 29, 2001

(30) Foreign Application Priority Data

Sep. 17, 1999 (DE) ........................................ 199 44 611

(51) Int. Cl.$^{7}$ ............................ F16J 15/02; F16J 15/50

(52) U.S. Cl. ....................... 277/650; 277/641; 277/906; 428/71; 229/87.05; 49/475.1; 52/656.5

(58) Field of Search ................................ 277/628, 650, 277/641, 637, 900; 49/475.1; 52/656.4, 656.5; 229/87.05

(56) References Cited

U.S. PATENT DOCUMENTS

| | | | | |
|---|---|---|---|---|
| 1,742,195 A | | 1/1930 | Bosley | |
| 3,301,687 A | * | 1/1967 | Davy | 426/113 |
| 3,497,131 A | * | 2/1970 | Tracy | 229/87.05 |
| 4,126,966 A | * | 11/1978 | Lobell | 428/319.9 |
| 4,204,373 A | | 5/1980 | Davidson | |
| 4,344,265 A | | 8/1982 | Davidson | |
| 4,592,941 A | * | 6/1986 | Emmons | 428/113 |
| 4,977,018 A | * | 12/1990 | Irrgeher et al. | 428/314.4 |
| 5,072,952 A | * | 12/1991 | Irrgeher et al. | 277/652 |
| 5,686,174 A | * | 11/1997 | Irrgeher | 428/322.7 |
| 6,250,468 B1 | * | 6/2001 | Huchel | 229/87.05 |
| 6,250,647 B1 | * | 6/2001 | Castensson | 277/630 |
| 6,422,575 B1 | * | 7/2002 | Czaplicki et al. | 277/628 |
| 6,453,620 B1 | * | 9/2002 | Williams et al. | 52/2.15 |
| 6,464,229 B1 | * | 10/2002 | Kogler et al. | 277/314 |
| 6,510,945 B1 | * | 1/2003 | Allwein et al. | 206/388 |

FOREIGN PATENT DOCUMENTS

| | | | | |
|---|---|---|---|---|
| DE | 100015667 A1 | * | 10/2001 | A44B/19/14 |
| EP | 0072955 | | 3/1983 | |
| EP | 88117173 | | 4/1989 | |
| EP | 88118716 | | 5/1989 | |
| EP | 0530653 | | 3/1993 | |
| EP | WO 9634780 A | * | 7/1996 | B60R/21/16 |
| EP | WO 9634780 | * | 7/1996 | B60R/21/16 |
| GB | 2332900 A | * | 7/1999 | B65D/75/58 |
| WO | 9845565 | | 10/1998 | |

* cited by examiner

*Primary Examiner*—Lloyd A. Gail
*Assistant Examiner*—Christopher Boswell
(74) *Attorney, Agent, or Firm*—Martin A. Farber

(57) ABSTRACT

Sealing strip (1) for sealing a joint (23) between a frame profile (12), for example a window-frame profile, and a wall (15), having an elastically resilient foam strip (2) which is accommodated in a compressed state in a tear-open wrapper (3), which allows recovery of the foam strip (2). The tear-open wrapper (3) comprises a plastic sheet (F) which encloses the foam strip (2) and, at the same time, forms a tear-off flap (4) extending in longitudinal direction of the sealing strip (1).

26 Claims, 4 Drawing Sheets

SEALING STRIP FOR SEALING A JOINT

Figure 1:
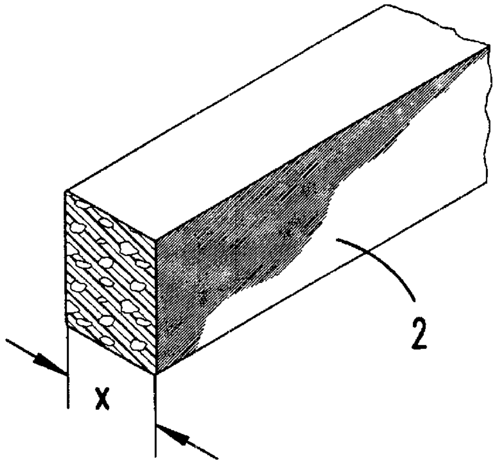

The invention relates to a sealing strip for sealing a joint between a frame profile, for example window-frame profile, and a wall, having an elastically resilient foam strip which is accommodated in a compressed state in a tear-open wrapper, which allows the recovery of the foam strip.

It is known from EP 0 530 653 B1 to form the tear-open wrapper from a C-profiled strip, the C-opening of which is closed by a cover strip. A lug-like pulling tab, which is secured with clamping action, acts on this cover strip. Actuation of the pulling tab makes it possible to release the peripheral groove-securing arrangement between the wrapper-forming parts. The foam strip, advancing beyond the C-opening, may then pass into its active position.

U.S. Pat. Nos. 4,204,373 and 4,344,265 propose to effect opening of the wrapper by a rip cord with a pulling ring disposed at the end as a grip. The wrapper here comprises a strip body which is of approximately hat profile in cross-section and the hat edge of which has a card-like closure wall and can be attached to the relevant object.

It is an object of the invention to form a sealing strip of the generic type such that it is constructed and disposed in an advantageous manner.

This object is achieved first and foremost in the case of a sealing strip having the features of claim 1, this being based on the fact that the tear-open wrapper comprises a plastics sheet which encloses the foam strip and, at the same time, forms a tear-off flap extending in the longitudinal direction of the sealing strip. Such a plastics sheet is thus utilized to form a chamber and pulling tabs. Added to this is the fact that the plastics sheet encasing the foam strip may also be transferred into roll form, with the advantage that it can be cut to length with lower losses being incurred. All that is required is for such a sheet strip to be folded, it being possible for a hem or tube which accommodates the foam strip to be formed in the region in front of the fold The enclosing operation here is effected extremely straightforwardly in that the plastics sheet is attached to itself in order to form the tear-open wrapper. A wide range of different embodiments are possible here, as explained herein-below. First of all, it should also be pointed out that the foam strip may be made of an open-cell PU foam. Provision is made here for the foam strip to be impregnated for delayed recovery. An example of a possible impregnating agent is an acrylate. As far as the open-cell foam with delayed recovery is concerned, you are referred to European Patent Applications 88 117 173 and 88 118 716 and to European Patent 72 955. The attachment indicated may be formed by sewing. This has the advantage of the stitches being utilized as a perforation line. Another advantageous possibility is provided by welding. For this purpose, use is made, for example, of a sheet material with appropriate thermal response. The attachment may also be realized, however, by adhesive bonding. In this case, the invention proposes that the foam strip is attached to the plastics sheet inside the tear-open wrapper. Partial attachment is sufficient, so that the torn-open opening edges of the plastics sheet can move and the plastics strip can thus advance freely in a forcible manner, with or without delay, for abutment against the surface which is to be sealed. The attachment between foam strip and plastics sheet is formed by adhesive bonding. Use is preferably made of an adhesive which undergoes good anchoring in the open-cell foam strip. An advantageous feature then consists in that a double-sided adhesive strip is disposed inside the tear-open wrapper, the adhesive strip being adhesively bonded, on one side, to the plastics sheet and, on the other side, to the foam strip. For the purpose of positioning the sealing strip, it proves to be advantageous for the latter to have a longitudinal adhesive strip on the outside for adhesive bonding to the frame profile or a bar. This longitudinal adhesive strip, which is located along the rear of the inner adhesive strip, results in a laminate-like wall-stiffening means as an advantageous supporting space for the foam strip as it is relieved of stressing. This is manifested by the feature of the longitudinal adhesive strip being disposed such that it overlaps the inside attachment between the foam strip and the plastics sheet. This is further optimized in that the plastics sheet is reinforced in the region of the attachment between foam strip and the plastics sheet and/or of the outer longitudinal adhesive strip. The reinforcement is preferably realized by reinforcing filaments. Such reinforcing filaments may be disposed as a reinforcing network. For the purpose of positioning a corresponding reinforcement, use is made of the measure of the reinforcement being adhesively bonded to the plastics sheet. The reinforcement is embedded to good effect if it forms a intermediate layer between the inner double-sided adhesive strip and the inner surface of the plastics sheet. It is also proposed that the tear-off flap comprises the two double-layer-forming ends of the plastics sheet. Such a double-layered pulling lug is correspondingly stable for use.

The invention then relates to a compressed foam strip which is disposed in a bar and is accommodated in a tear-open wrapper, protection being afforded to the fact that a tear-open flap, which is formed from the tear-open wrapper itself, the latter being in the form of a plastics sheet, projects in the outward direction beyond the bar in order to eliminate the compression. Such a bar makes it possible to vary the supporting plane for the foam strip in relation to the frame profile, that is to say to select the sealing abutment pressure. It is advantageous here for the mount, which is formed in the bar, to be of bench-like form in cross-section. This produces a substantially rebate-like mount. Finally, it is proposed that parallel to the bench backrest of the mount, but located opposite the same, the bar has an adhesive surface for adhesive bonding to the frame profile. When not in use, the adhesive surface may be kept free of dust via a pull-off protecting strip. To conclude, provision is also made for the bar to be associated with the frame profile such that it leaves a gap for the tear-off strip (sic). The attachment is hidden from view in the gap depth, but the root of the tear-off flap is not clamped in.

Figure 2:
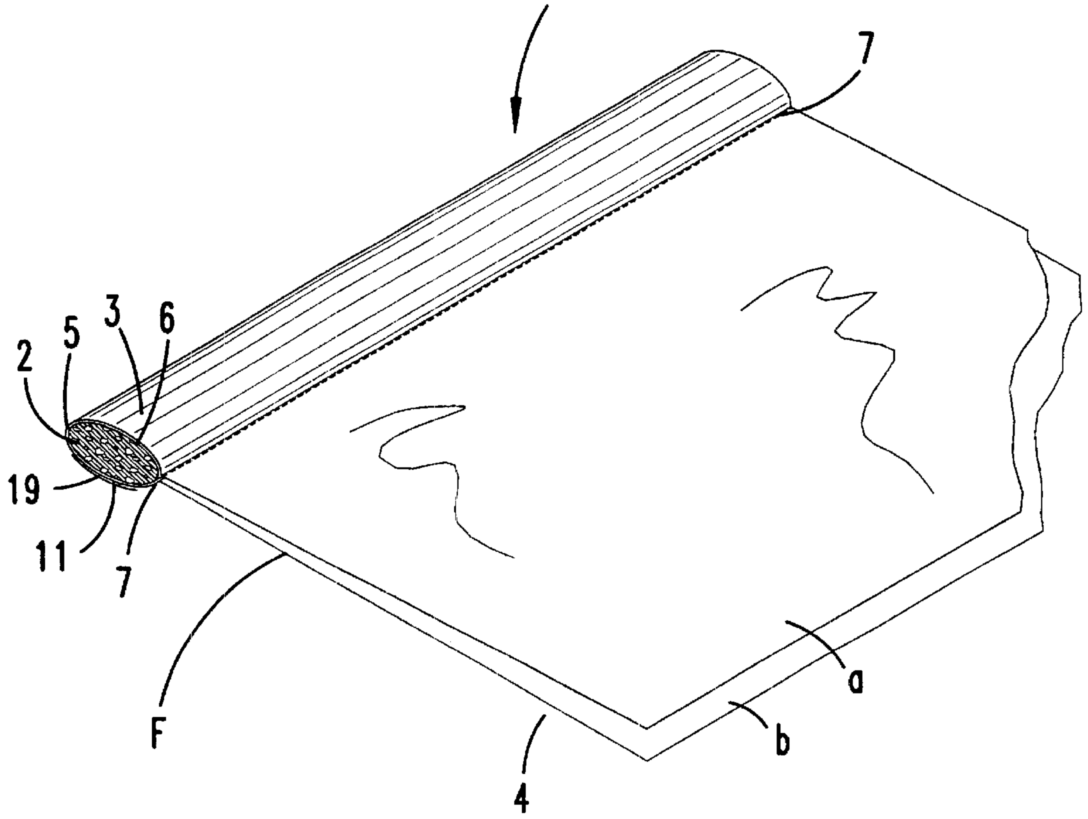
Figure 3:
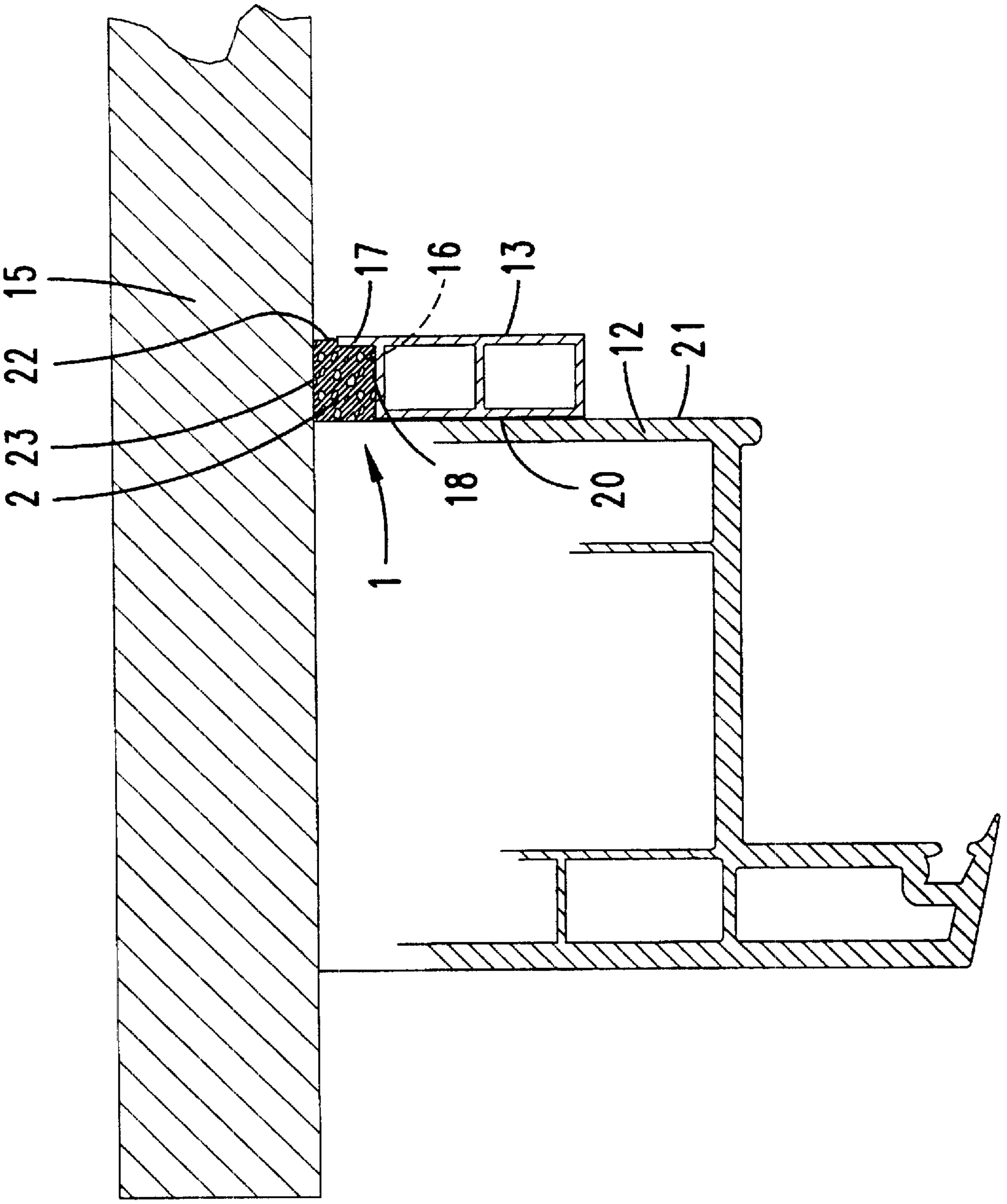
Figure 4:
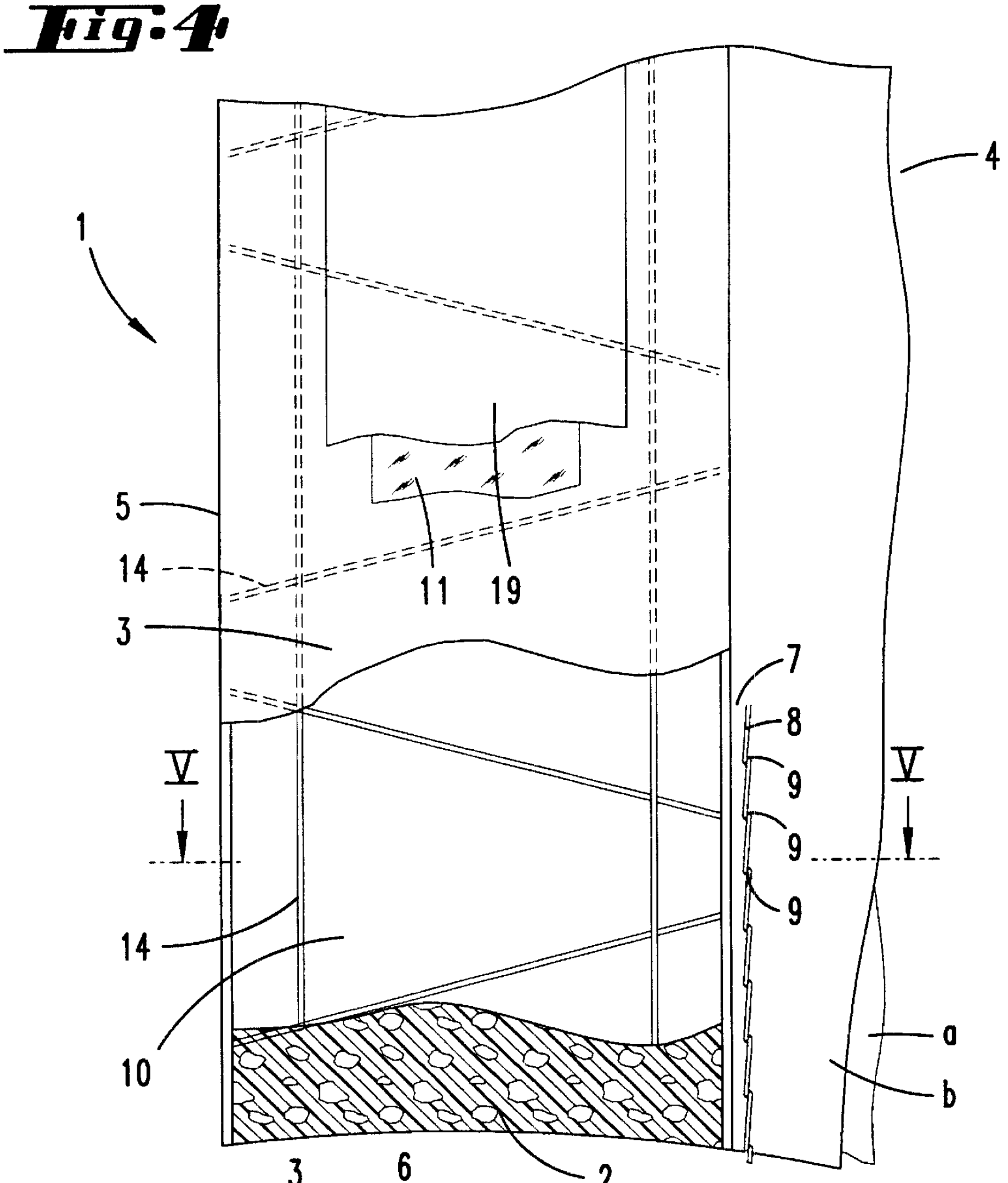
Figure 5:
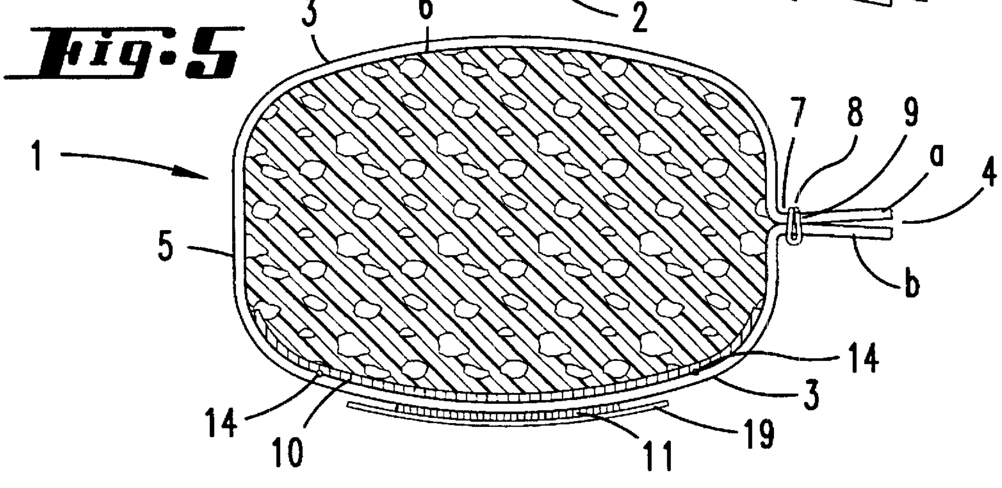
Figure 6:
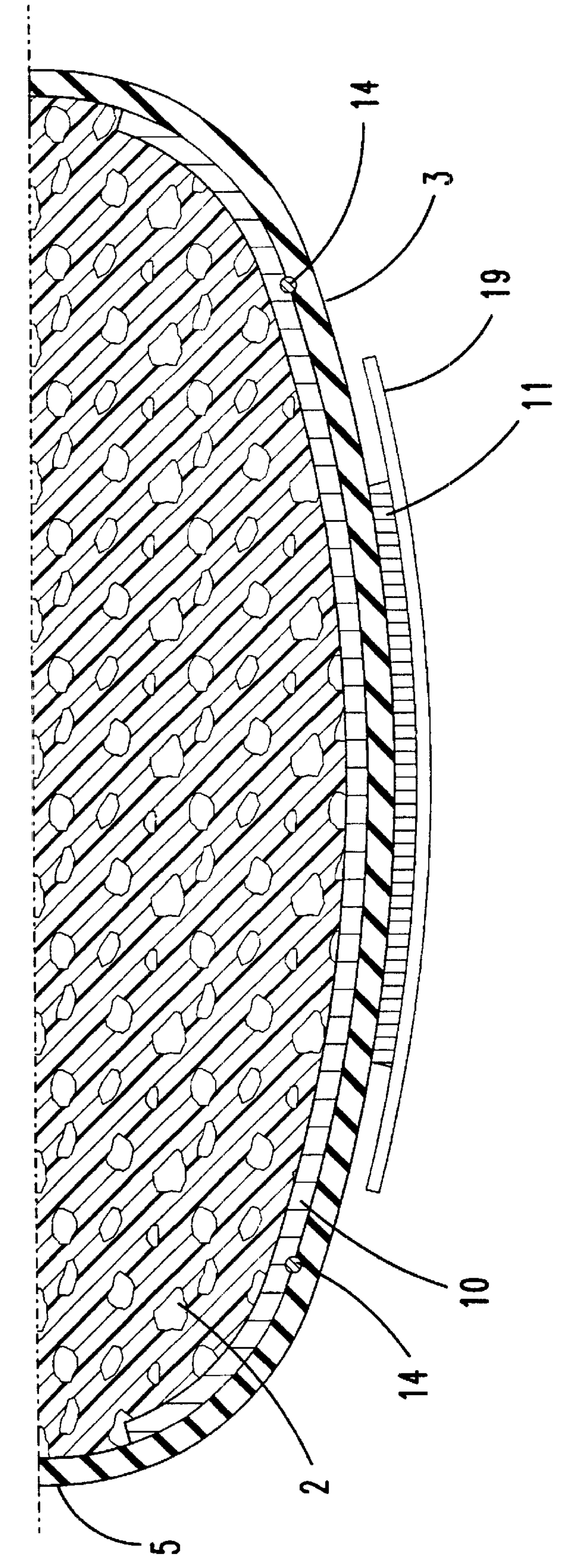

The subject matter of the invention is explained in more detail herein-below with reference to an exemplary embodiment illustrated in the figures, in which:

FIG. 1 shows a perspective illustration of a portion of a foam strip in its non-compressed state, FIG. 2 shows, likewise in a schematic illustration, a portion of a sealing strip with encased foam strip, in the compressed state, FIG. 3 shows a cross-section through a region of a frame profile in the direction of a wall with associated foam strip, accommodated in a bar, FIG. 4 shows, on a vastly enlarged scale and broken away in layers, a plan view of a portion of the sealing strip, FIG. 5 shows the section along line V—V in FIG. 4, and FIG. 6 shows an enlargement from FIG. 6 (sic).

The core of the sealing strip 1 according to the invention is an elastically resilient foam strip 2. The latter is of open-cell formation and consists, for example, of PU foam.

The foam strip 2 is impregnated in the case of a delayed recovery being preferred. An acrylate is a possible impregnating means.

The foam strip 2 has a rectangular cross-section. The compression takes place in a plane parallel to the longer side of the rectangle. The longer side is longer approximately by half the width of the sealing strip 2. The full width is designated x and, in the exemplary embodiment illustrated, is approximately 15 mm.

The compression is present in the state in which the foam strip is encased to render its volume smaller. This is shown in FIG. 2 and achieved by a tear-open wrapper 3.

The tear-open wrapper 3 comprises a plastics sheet F which encloses the foam strip 2 and, at the same time, forms a tear-off flap 4 extending in the longitudinal direction of the sealing strip 1. The plastics sheet F is of limp nature. It is a strip which is deflected about a longitudinally running fold 5. This strip, at a spacing in front of the fold 5, is configured in the form of a hem or tube, thus forming the said tear-open wrapper 3.

Enclosed in the tear-open wrapper 3, the foam strip 2 is compressed, in the direction of its cross-sectionally longitudinal side, to a good third of its original configuration according to FIG. 1. The corners become slightly rounded, so that, as seen in cross-section, the barrel-like outline which can be seen in FIG. 5 is produced.

The interior of the hem or tube, which accommodates the compressed, resilient body, is designated 6. It is filled to a taut state, which does not adversely affect the rollability of such a sealing strip 1.

The plastics sheet F, which encloses the foam strip 2, is attached to itself in order to form the tear-open wrapper 3. The attachment, which is remote from the fold 5, is designated 7. The attachment 7 can be realized in a wide range of different ways: It is preferably realized by sewing, for example in the form of a finishing seam. The corresponding seam 8, containing upper threads and underthreads, can be seen particularly clearly from FIGS. 4 and 5. The stitches 9 here form a row of perforations, as is known, for example, in the case of stamps. This produces, between the tear-off flap 4 and the tear-open wrapper 3, which forms the interior 6, a linear severing location along the encased foam strip. The envelope tears open, releasing the foam carrier, which surges forwards.

In another embodiment, the attachment 7 may be formed by welding. In this case, material with a thermal response is used as the plastics sheet F. The welding makes it possible, for all practical purposes, to achieve a weld in the sheet halves a and b which leaves a ridge as a connecting bridge, similar to a score line.

Another type of attachment 7 may be realized by using adhesive bonding, possibly with an additionally provided perforation for realizing a predetermined tearing location.

The foam strip 2 is secured against movement in relation to the plastics sheet F enveloping it. For this purpose, the foam strip 2 is attached inside the tear-open wrapper 3. This attachment between the foam strip 2 and the plastics sheet F is formed by adhesive bonding. Use is made of a double-sided adhesive strip 10. You are referred here to FIG. 5 and the enlargement thereof. The adhesive strip 10 is adhesively bonded, on one side, to the plastics sheet F and, on the other side, to the foam strip 2. This has a production-related advantage at the same time since, with the tear-open wrapper still open, that is to say not yet forming the interior 6, the foam strip 2 can be secured precisely on the plastics sheet F in its still-open state, i.e. when opened out in a planar manner.

As can also be gathered from FIG. 5, the sealing strip 1 is provided with a longitudinal adhesive strip 11 on the outside. This adhesive strip makes it possible for the sealing strip to be secured on an envisaged object, for example on a frame profile 12 or a bar 13 connected thereto. Plastics profile material may be involved in both cases.

The longitudinal adhesive strip 11 is also a double-sided adhesive strip. As is also shown in FIG. 5, the longitudinal adhesive strip 11 is located such that it overlaps the inner attachment between the foam strip 2 and the plastics sheet F. This produces, including the part forming the tear-open wrapper 3, a three-layered laminate with good strength. This strength is further increased by a special reinforcing measure. As far as production is concerned, this is manifested in the measure of the plastics sheet being reinforced in the region of the attachment between the foam strip 2 and the plastics sheet F and/or of the outer longitudinal adhesive strip 11. This reinforcement is provided by reinforcing filaments 14. These are made up of longitudinally running filaments and transversely running filaments, which are all designated 14. The longitudinal filaments run at least in the vicinity of the fold 5 and attachment 7. The transverse filaments follow a substantially zigzag course, although the points of inflection have been cut off. It can be seen that the longitudinal and transverse filaments make up a reinforcing network. Such a network or grid may be fixed, for example fused, at the crossover points of the filaments. This reinforcement is otherwise adhesively bonded to the plastics sheet F utilizing the adhesive strip 10. The reinforcing network, which is thus also retained to the greatest extent at the crossover points, likewise tolerates storage in rolled-form, as indicated above.

It can be seen that the reinforcement, overall, forms an intermediate layer between the inner double-sided adhesive strip 10 and the inner surface of the plastics sheet F.

FIG. 5 shows that the reinforcement also extends right into the vicinity of the region of the attachment 7, which forms the predetermined severing location. Sufficient fixing support is thus also ensured when the tear-off flap 4 is to be severed, which tear-off flap 4 comprises the two double-layer-forming ends of the halves a, b of the plastics sheet F. Depending on size, these halves may also function as plaster protection in the direction of the wall 15. This wall 15 may be, for example, the reveal of a cavity of a building structure.

As far as the bar 13, which has already been indicated above, is concerned, it may be used as a carrier of the sealing strip 1, to be precise both as a structural unit which can be fitted out beforehand and as a bar 13 which is only assembled. i.e. fitted, on site.

In the direction of the wall 15, the bar 13, in profile, forms a mount 16 for the sealing strip 1, i.e. in particular the compressed foam strip 2, which, here too, is accommodated in a tear-open wrapper 3 until the positioning work of the bar 13 has been completed. Release then takes place.

The mount is formed by a cross-sectional region of the bar 13 which is configured in a bench-like manner in the direction of the wall. The bench backrest 17 delimits the mount 16 in the outward direction, i.e. on the reveal cavity side. The bench seat surface 18 forms the supporting base for the sealing strip 1. The longitudinal adhesive strip 11 also acts as an adhesion promoter here and, when not in use, is covered by a protective strip 19. The periphery of the protective strip 19, which consists, for example, of silicone-treated paper, is free to allow gripping beneath it.

FIG. 3 shows that parallel to the bench backrest 17 of the mount 16, but located opposite the same, the bar 13 has an adhesive surface 20 for adhesive bonding to a corresponding mating surface 21 of the frame profile 12.

The bar 13 is associated with the frame profile 12 such that it leaves a gap, in the direction of the wall 15, for the tear-off flap 4. The gap is designated 22. The height of the bench backrest 17 is slightly less than the maximum-compression height of the foam strip 2.

Depending on the desired recovery force selected for the foam strip 2, the bar 13 may be positioned at a greater or lesser spacing from the wall 15.

The bar 13 is a box profile produced in a space-saving manner.

By virtue of the tear-off flap 4 being severed, the foam body, advancing out of the wrapper 3 with a widening gap, slides against the surface which is to be sealed. Sheet material is removed here at least from the region directed towards the gap 22, which is thus reliably sealed. The joint 23 between the wall 15 and frame profile 12 is closed.

All features disclosed are pertinent to the invention. The disclosure contents of the associated/attached priority documents (copy of the prior application) are hereby also included in full in the disclosure of the application, also for the purpose of incorporating features of these documents in claims of the present application.

What is claimed is:

1. Sealing strip (1) for sealing a joint (23) between a frame profile (12), and a wall (15), having an elastically resilient foam strip (2) which is accommodated in a compressed state in a tear-open wrapper (3), which allows recovery of the foam strip (2), wherein the tear-open wrapper (3) comprises a plastic sheet (F) which encloses the foam strip (2) and, at the same time, forms a tear-off flap (4) extending in longitudinal direction of the sealing strip (1), wherein the plastic sheet is arranged as a strip deflected about a longitudinally running fold and is attached to itself at a distance from said longitudinally running fold.

2. Sealing strip according to claim 1, wherein the plastics sheet (F) is attached to itself to form the tear-open wrapper (3).

3. Sealing strip according to claim 1, wherein the foam strip is an open-cell PU foam strip (2).

4. Sealing strip according to claim 1, wherein the foam strip (2) is impregnated for delayed recovery.

5. Sealing strip according to claim 4, wherein impregnating agent is an acrylate.

6. Sealing strip according to claim 2, wherein attachment (7) is formed by sewing.

7. Sealing strip according to claim 2, wherein attachment (7) is formed by welding.

8. Sealing strip according to claim 2, wherein attachment (7) is formed by adhesive bonding.

9. Sealing strip according to claim 1, wherein the foam strip (2) is attached to the plastics sheet (F) inside the tear-open wrapper (3).

10. Sealing strip according to claim 9, wherein attachment between the foam strip (2) and plastics sheet (F) is formed by adhesive bonding.

11. Sealing strip according to claim 1, wherein a double-sided adhesive strip (10) is disposed inside the tear-open wrapper (3), the adhesive strip being adhesively bonded, on one side, to the plastics sheet (F) and, on the other side, to the foam strip (2).

12. Sealing strip according to claim 1, wherein the sealing strip (1) has a longitudinal adhesive strip (11) on an outside for adhesive bonding to the frame profile (12) or a bar (13).

13. Sealing strip according to claim 12, wherein the longitudinal adhesive strip (11) is disposed such that it overlaps an inside attachment between the foam strip (2) and the plastics sheet (F).

14. Sealing strip according to claim 1, wherein the plastics sheet (F) is reinforced in a region of attachment between the foam strip (2) and the plastics sheet (F) and/or of an outer longitudinal adhesive strip (11).

15. Sealing strip according to claim 14, wherein reinforcement is formed by reinforcing filaments (14).

16. Sealing strip according to claim 15, wherein the reinforcing filaments (14) are disposed as a reinforcing network.

17. Sealing strip according to claim 14, wherein reinforcement is adhesively bonded to the plastics sheet (F).

18. Sealing strip according to claim 14, wherein reinforcement forms an intermediate layer between an inner double-sided adhesive strip (10) and an inner surface of the plastics sheet (F).

19. Sealing strip according to claim 1, wherein the tear-off flap (4) comprises two double-layer-forming ends of the plastics sheet (F).

20. Sealing strip according to claim 1, wherein the frame profile is a window frame profile.

21. Compressed foam strip (2) which is disposed in a bar (13) and is accommodated in a tear-open wrapper (3), wherein a tear-off flap (4), which is formed from the tear-open wrapper (3) itself, the latter being in form of a plastics sheet (F), projects in an outward direction beyond the bar (13) e to release compression.

22. Foam strip according to claim 21, wherein mount (16), which is formed in the bar (13), is of bench-like form in cross-section.

23. Foam strip according to claim 22, wherein parallel to a bench backrest (17) of the mount (16), but located opposite same, the bar (13) has an adhesive surface (20) for adhesive bonding to frame profile (12).

24. Foam strip according to claim 21, wherein the bar (13) is associated with frame profile (12) such that it leaves a gap for the tear-off flap (4).

25. Sealing strip (1) for sealing a joint (23) between a frame profile (12) and a wall (15), having an elastically resilient foam strip (2) which is accommodated in a compressed state in a tear-open wrapper (3), which allows recovery of the foam strip (2), wherein the tear-open wrapper (3) comprises a plastic sheet (F) which encloses the foam strip (2) and, at the same time; forms a tear-off flap (4) extending in a longitudinal direction of a sealing strip (1), wherein the plastic sheet (F) is attached to itself to form the tear-open wrapper (3) and the foam strip (2) is attached to the plastic sheet (F) inside the tear-open wrapper (3).

26. Sealing strip according to claims 25, wherein the frame profile is a window frame profile.

* * * * *